(12) United States Patent
Richmond et al.

(10) Patent No.: US 6,223,943 B1
(45) Date of Patent: May 1, 2001

(54) METHOD AND APPARATUS FOR MOLDING MULTICHAMBER SQUEEZE TUBES AND TUBES PRODUCED THEREBY

(75) Inventors: Thomas Michael Richmond, Evansville, IN (US); Thomas F. Wiegner, St. Charles, IL (US)

(73) Assignees: Bristol-Meyers Squibb Company, New York, NY (US); RXI Plastics, Inc., Triadelphia, WV (US)

( * ) Notice: Subject to any disclaimer, the term of this patent is extended or adjusted under 35 U.S.C. 154(b) by 0 days.

(21) Appl. No.: 09/499,512

(22) Filed: Feb. 7, 2000

(51) Int. Cl.[7] .................................................. B65D 35/22
(52) U.S. Cl. .................................................. 222/94
(58) Field of Search .................... 222/94, 145.3, 222/145.1, 485, 562

(56) References Cited

U.S. PATENT DOCUMENTS

| | | | |
|---|---|---|---|
| 1,535,529 | * 4/1925 | Hopkins | 222/94 |
| 3,227,319 | 1/1966 | Rosier . | |
| 3,747,804 | * 7/1973 | Raaf et al. | 222/94 |
| 4,211,341 | 7/1980 | Weyn . | |
| 4,461,403 | 7/1984 | Prahs . | |
| 5,076,470 | 12/1991 | Hatakeyama et al. . | |
| 5,388,727 | 2/1995 | Jouillat . | |

* cited by examiner

Primary Examiner—Kevin Shaver
Assistant Examiner—Patrick Buechner
(74) Attorney, Agent, or Firm—Richard V. Westerhoff; Eckert Seamans Cherin & Mellott, LLC

(57) ABSTRACT

A container for dispensing two flowable products in desired proportions includes a multichamber squeeze tube with a pair of nested tubes and a dispensing neck on it that are integrally molded with a transverse wall as a single piece. Apertures in the end wall provide dispensing openings for a first chamber inside the inner tube, and for a second chamber between the two tubes. The transverse wall has an annular stepped wall portion in it between the two tubes that is generally parallel with the outer surface of the dispensing neck and has a dispensing opening through the stepped wall portion. The openings through the stepped wall are formed by parting line contact between the mold surfaces of the mold used to form the squeeze tube. The single piece, two chamber squeeze tube is molded in a straight draw mold with a split mold piece only required to release external threads formed on the neck. A cap with internal threads screws onto the threaded neck.

6 Claims, 4 Drawing Sheets

METHOD AND APPARATUS FOR MOLDING MULTICHAMBER SQUEEZE TUBES AND TUBES PRODUCED THEREBY

BACKGROUND OF THE INVENTION

1. Field of the Invention

This invention relates to a method and apparatus for molding squeeze tube containers for storing and dispensing flowable products and particularly to a technique for molding a multichamber squeeze tube in which mating mold surfaces form an opening through a transverse end wall between tubes on the dispensing container, and to the squeeze tube container formed thereby.

2. Background Information

Containers formed of pliable resin which can be squeezed to dispense a flowable product are well known. Some of these containers have two or more chambers containing separate components which are mixed as they are dispensed. The known multichamber squeeze containers have a separate end piece which is preformed and then fixed to the separately formed tube sections or, in some cases, is molded to preformed tubular sections. In the latter case, the preformed tubes are supported in a mold which is then filled with flowable resin, or are sealed with a laminate. The resin hardens to form the end piece in which the ends of the tubes are imbedded. In some cases, the end piece is complex and can have multiple pieces which require assembly. The multiple chambers are filled with the different flowable products from the opposite ends of the tubes which are then closed, usually by flattening and sealing. The end piece has dispensing openings for each of the chambers, typically sized to effect a desired mix of the flowable products which are dispensed by squeezing the tubes. The squeezing force applied to the outer tube is transmitted to the inner tube or tubes through the intervening flowable product or products.

These known multichamber squeeze tubes require separate steps to form the tubes, load them into a mold and then mold the dispensing end piece to engage the preformed tubes. In other cases, the tubes and end pieces are separately formed and then joined. In both cases, several steps are required to form a multichamber squeeze tube which adds to the cost and production time.

It is also known to mold multichamber squeeze tube containers as a single unit as is disclosed in U.S. patent application Ser. No. 09/164,143, filed Sep. 1, 1998, and having common ownership with one of the inventors of the subject invention.

There is a need for an improved method and apparatus for molding a multichamber squeeze tube that can be made quickly and inexpensively.

More specifically, there is a need for such an improved multichamber squeeze tube that uses a simple mold.

SUMMARY OF THE INVENTION

These needs and other are satisfied by the invention which is directed to a method and apparatus for molding a multichamber squeeze tube having at least two tubes with a first tube nested inside a second tube. The first chamber is formed inside the first tube and a second chamber is formed between the first and second tubes. A transverse wall extends across first ends of the first and second tubes to close off the first and second chambers and cylindrical neck portions preferably extend upwardly from the transverse wall. The tubes, the transverse wall and neck portions are integrally molded as a single piece. The transverse wall is formed with at least one dispensing opening extending therethrough and aligned with the first chamber and at least one second dispensing opening extending therethrough and communicating with the second chamber. After the first chamber is filled with a first flowable fluid and the second chamber is filled with a second flowable fluid through the second ends, the second ends of the tubes are closed off, preferably by flattening and sealing.

The transverse wall of the container has an annular stepped wall portion in it between the first and second tubes and the dispensing openings for the second tube are through that stepped wall portion. The stepped wall portion of the transverse wall is generally cylindrical and parallel with the walls of the tubes and has generally planar annular wall portions on both sides of the stepped wall portion.

In the method and apparatus of this invention, the stepped wall portion and openings through it are formed by the outer core and an insert cavity member in the mold for forming the squeeze tube container. The outer core has a first annular rim on its end surface and the insert cavity member has a second annular rim on its end surface which is smaller than the annular rim on the outer core so the rims are radially spaced apart when the mold is closed. At least one of the rims has at least an arcuate rib on a side surface facing the other rim. The arcuate rib has a parting line contact surface with the other rim so as to form an opening through the stepped wall portion. The arcuate rib(s) are preferably located on the annular rim on the insert cavity member.

The invention embraces a method and apparatus for molding a multichamber squeeze tube, a squeeze tube so molded, and a combination of the squeeze tube with a cap which engages the neck such as by complementary threads on the inner surface of a peripheral skirt of the cap and the outer surface of the cylindrical neck of the squeeze tube.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
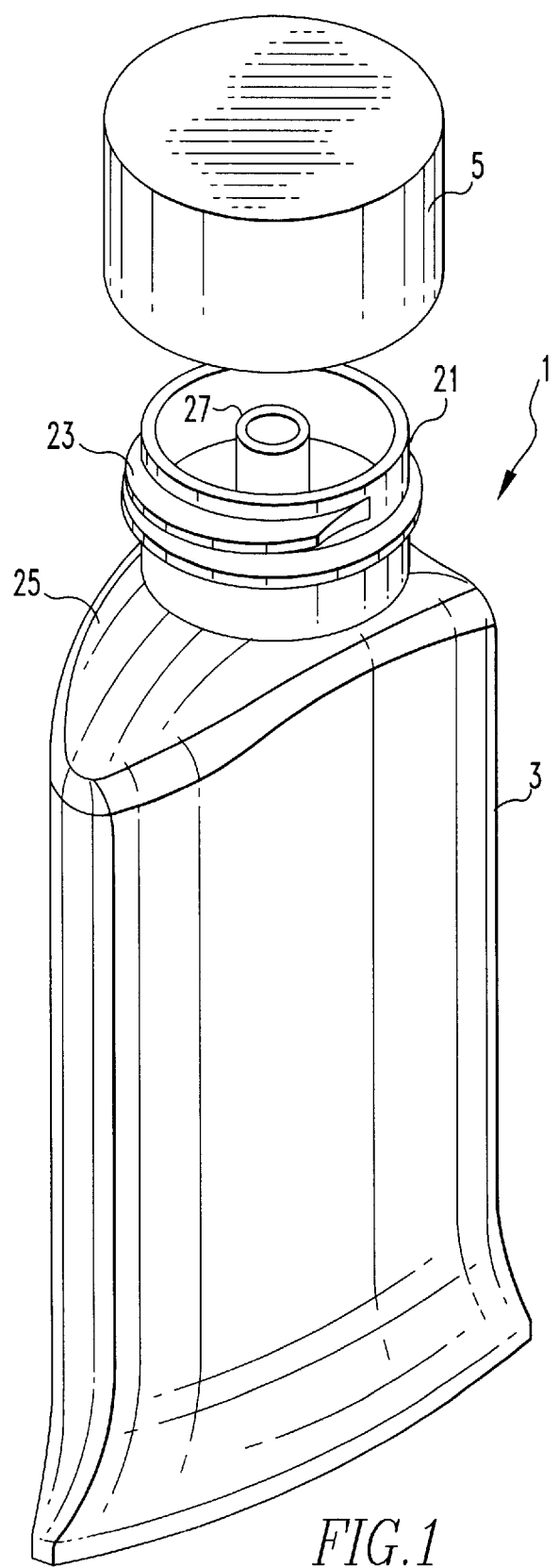
FIG. 1 is an isometric view of container assembly produced in accordance with the invention.
Figure 2:
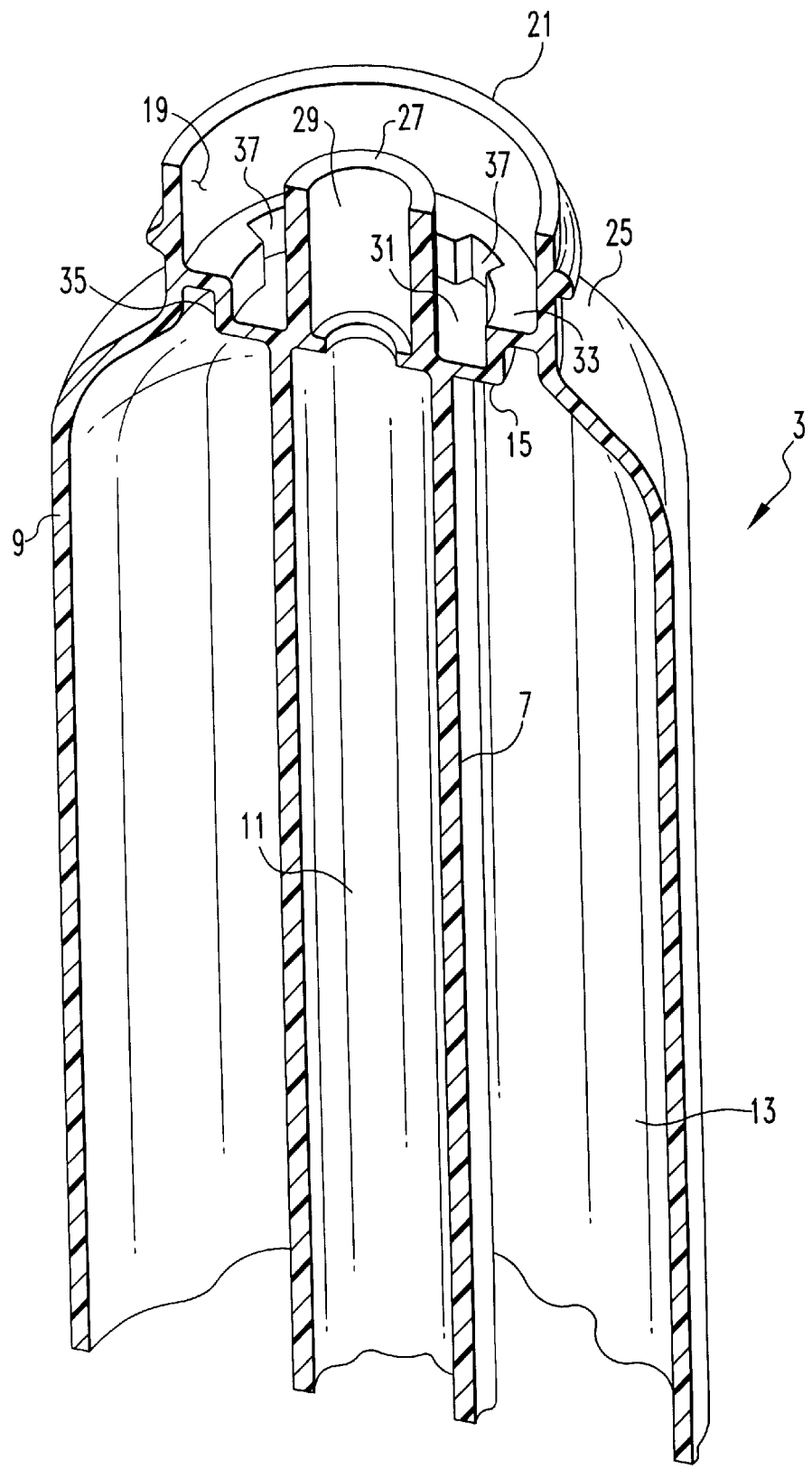
FIG. 2 is an isometric cross-sectional view of a squeeze tube container of the invention.

Referring to FIGS. 1 and 2, the container 1 of the invention includes a multichamber squeeze tube 3 and a cap 5. The multichamber squeeze tube 3 has a first, inner tube 7 nested inside of a second, outer tube 9. A first chamber 11 is formed inside the inner tube 7 and a second chamber 13 is formed between the inner tube 7 and the outer tube 9. The first and second tubes 7 and 9 are integrally molded with a transverse wall 15 extending between first or upper ends of the tubes 7 and 9. This transverse wall 15 integrally connects the upper ends of the inner and outer tubes 7 and 9. The squeeze tube 3 is formed with a cylindrical neck 21 at the upper end having integrally molded external threads 23 on it for engaging internal threads, not shown, in the cap 5. Alternatively, other devices can be used for securing a cap to the neck of the container such as, for example, a snap connection.

As best seen in FIG. 2, the outer tube 9 and the inner tube 7 are preferably round in cross-section and concentrically disposed. The tubes 7 and 9 may also be out-of-round in cross-section, such as ellipsoidal. The outer tube 9 is connected to the cylindrical neck section 21 through an integrally molded shoulder 25. The inner tube 7 extends upward to the transverse wall 15, and a cylindrical spout or center neck portion 27 extends upwardly from the transverse wall 15 above the inner tube 7. The outer neck 21 and the inner spout 27 define an annular flow passageway 19 therebetween. The transverse wall 15 has a central opening 29 through it for flow of product from the inner tube 7 and through the spout 27. The spout 27 and neck 21 preferably terminate in substantially the same plane for sealing against the closure 5 to prevent products in the two tubes 7, 9 from mixing before they are squeezed from the container 1. The closure 5 may form a clamp-type seal with the neck 21 and/or the spout 27, as, for example, is disclosed in U.S. Pat. No. 5,161,707.

In accordance with this invention, the transverse wall 15 between the top ends of tubes 7, 9 is stepped in cross-section to include a substantially planar outer portion 31, a substantially planar inner portion 33, and a substantially cylindrical step portion 35 connecting the inner and outer planar portions 31, 33. The cylindrical step 35 has apertures 37 therethrough for providing flow communication between the second chamber 13 and the flow passageway 19. The central opening 29 provides communication from the first chamber 11 into the spout 27. The number and size of the apertures 37 and the size of opening 29 can be selected to provide a desired ratio of product dispensed from the chambers 11 and 13. The sizing of these apertures also depends on the relative viscosity of the flowable products. The chambers 11 and 13 can be filled with two flowable products from the bottom ends of the tubes 7 and 9 with the cap in place on the squeeze tube. The chambers are then closed by flattening the bottom second ends and then sealing them as is well known in the art. 5

Figure 3:
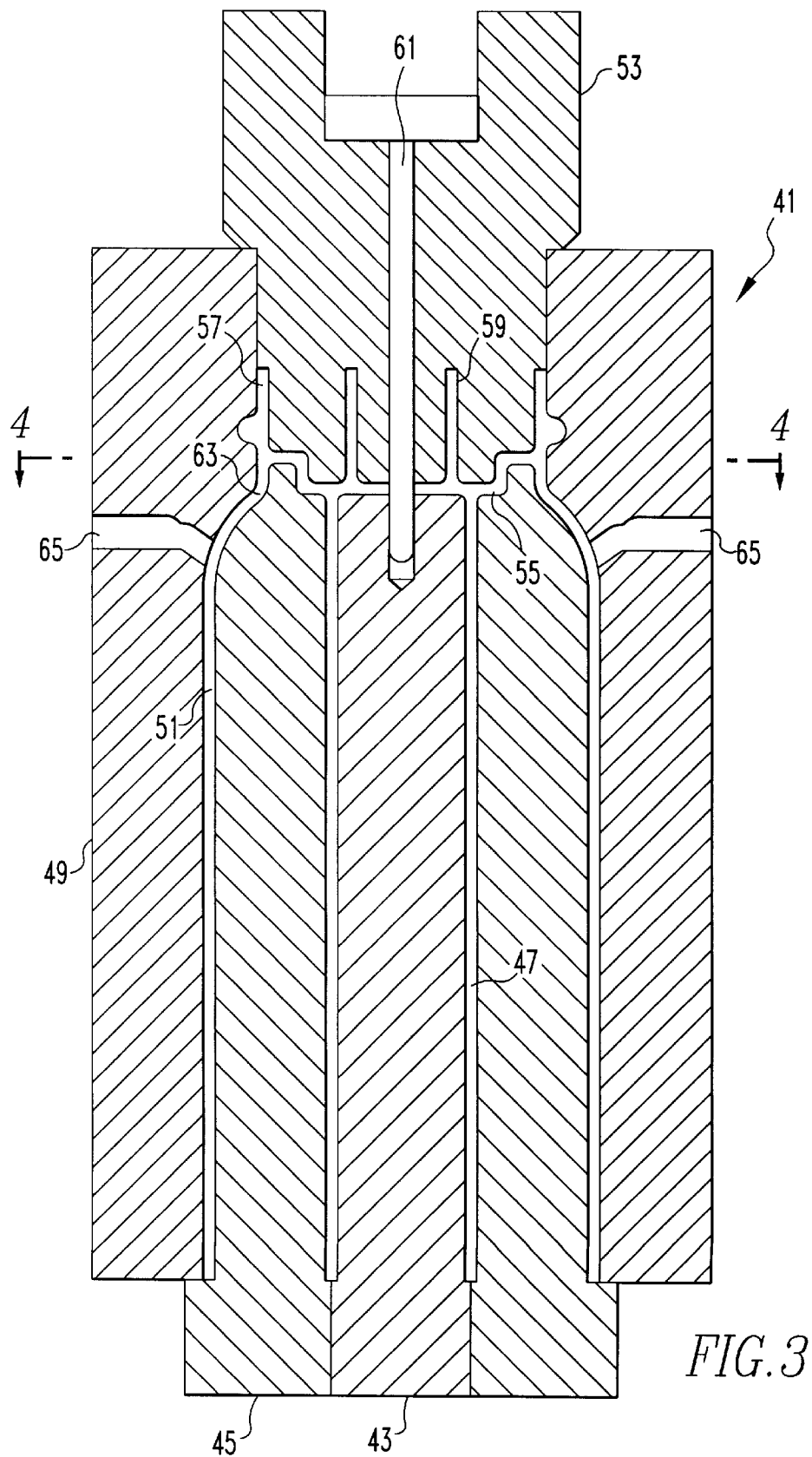
FIG. 3 is a vertical section through a mold which can be used to produce the multichambered container in accordance with the invention.
Figure 4:
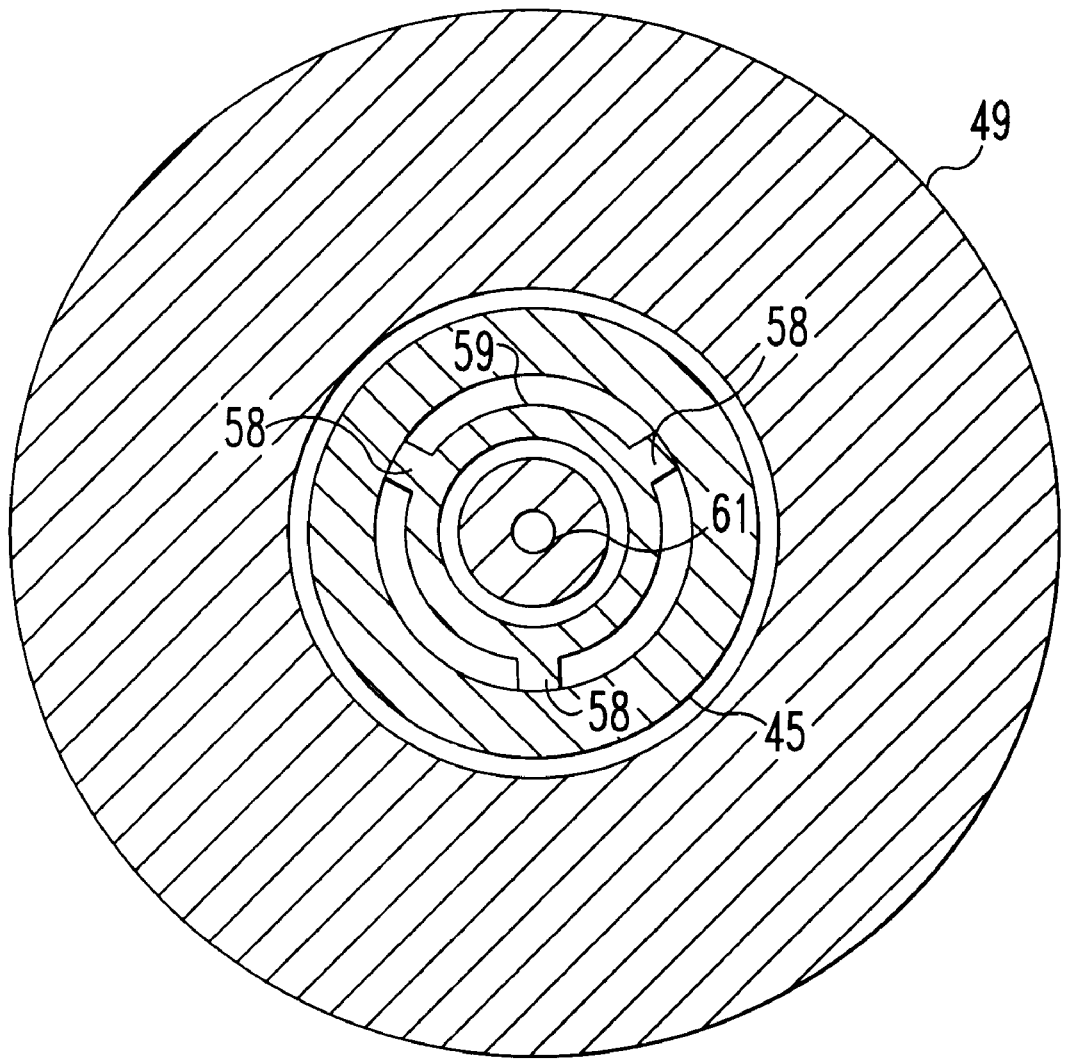
FIG. 4 is another cross-section through the mold of FIG. 3 taken along line 4—4 of that Figure.

As mentioned above, an important part of the invention is that the multichamber squeeze tube 3 is molded as a single unit. FIGS. 3 and 4 illustrate a mold 41 for forming the multichamber squeeze tube 3 in accordance with this invention. The mold 41 includes an inner core 43 and an outer core 45, which between them form a cavity 47 in which the first or inner tube 7 is formed. The mold 41 also includes a split cavity member 49 in which the cores 43 and 45 are inserted. The space 51 between the outer core 45 and the cavity member 49 provide the space in which the outer tube 9 is formed including the shoulder 25. The cavity member 49 comprises two halves which are adapted to be opened or spread to free a squeeze tube 3 from the cavity member after the tube has been molded.

A cavity insert 53 extends into a recess in the top of the cavity member 49 and is spaced from the top of the inner core 43 to provide the space 55 for the transverse wall to be molded, and is spaced from the cavity member 49 to provide the space 57 for the neck 21 of the squeeze tube to be molded. The insert 53 has a cylindrical channel 59 in it to form the spout 27 on the squeeze tube and has a core pin 61 that extends down from the cavity insert into the center of the inner core 43 to form the opening 29. Ejector pins, not shown, may also extend through the cavity insert 53 for ejecting the multichamber squeeze tube 3 from mold 41 as is well known in the art.

It is a feature of this invention that the mold 41 includes one or more arcuate ribs on either the cavity insert 53 or the outer core 45 to form the apertures 37 in the cylindrical step portion 35 of transverse wall 15. FIGS. 3 and 4 show three such ribs 58 on the cavity insert 53. The ribs 58 have sliding, parting line contact with the inner cylindrical surface on an annular rim 63. This parting line contact is shown on the left hand side of FIG. 3. A flow aperture 37 is formed through the step wall 35 at the location of each rib 57.

With the mold 41 assembled, as shown in FIG. 3, a molding resin is injected through the fill runner openings 65 into the cavities formed by the mold. Examples of suitable resins for molding the multichamber squeeze tube 3 are linear low density polyethylene, low density polyethylene, general purpose polypropylene, and high density polyethylene. Once the resin is set, the inner core 43 and outer core 45 are removed. Then the two halves of the cavity member 49 are separated to remove the mold squeeze tube. Once the squeeze tube has been removed, the molding runners are sheared off the part.

The multichamber squeeze tube 3 of the invention can be easily formed as a single piece. A straight draw mold can be used for forming the single piece with only the split sections of the mold needed if threads or other projections are provided on the neck. In order to assist in removing the multichamber squeeze tube from the mold 41, draft is preferably provided on the tube walls as is well known in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. In a multichamber squeeze tube for containing and dispensing flowable products, which includes a first tube nested in a second tube, said first and second tubes forming at least a first chamber inside said first tube and having a dispensing end integrally molded with said tubes on a first end of said tubes, the improvement comprising:

said dispensing end comprising an annular transverse wall connecting said first end of said first and second tubes, and inner and outer hollow cylindrical neck portions extending from said transverse wall for flow of product therethrough from said first and second tubes, said annular transverse wall including a stepped wall portion which is generally parallel with said cylindrical neck portions and having at least one opening through said stepped wall portion for flow of product from said second tube.

2. A multichamber squeeze tube as set forth in claim 1 in which said inner and outer cylindrical neck portions are substantially co-terminous.

3. A multichamber squeeze tube as set forth in claim 1 in which said outer cylindrical neck portion has closure-retaining cam means on its outer surface.

4. A multichamber squeeze tube as set forth in claim 1 in which said stepped wall portion has a plurality of openings through it.

5. A multichamber squeeze tube as set forth in claim 1 in which said annular transverse wall includes a substantially planar outer wall portion, a substantially planar inner wall portion offset with respect to the plane of said outer wall portion, and said stepped wall portion connects said outer and inner wall portions.

6. A multichamber squeeze tube as set forth in claim 5 in which said stepped wall portion is substantially cylindrical.

* * * * *